(12) United States Patent
Guth

(10) Patent No.: US 7,013,884 B2
(45) Date of Patent: Mar. 21, 2006

(54) DUST COLLECTION SYSTEM FOR A MASONRY SAW

(75) Inventor: Paul W. Guth, Menifee, CA (US)

(73) Assignee: Masonry Technology Incorporated, Moreno Valley, CA (US)

(*) Notice: Subject to any disclaimer, the term of this patent is extended or adjusted under 35 U.S.C. 154(b) by 197 days.

(21) Appl. No.: 10/802,272

(22) Filed: Mar. 17, 2004

(65) Prior Publication Data
US 2005/0205075 A1    Sep. 22, 2005

(51) Int. Cl.
*B28D 1/04* (2006.01)

(52) U.S. Cl. .................... 125/13.01; 451/411; 451/456
(58) Field of Classification Search ............. 125/13.01; 451/411, 451, 456
See application file for complete search history.

(56) References Cited

U.S. PATENT DOCUMENTS

| | | | |
|---|---|---|---|
| 3,151,607 A * | 10/1964 | Brouillard ....................... 126/6 |
| 3,200,688 A * | 8/1965 | Feeney et al. ................ 83/383 |
| 3,298,097 A * | 1/1967 | Gilbert ........................ 29/564 |
| 3,635,206 A | 1/1972 | Harclerode |
| 3,690,484 A * | 9/1972 | Harlan et al. ................ 414/412 |
| 4,068,648 A * | 1/1978 | Erdman .................... 125/13.01 |
| 4,428,159 A | 1/1984 | Sigetich et al. |
| 4,576,072 A | 3/1986 | Terpstra et al. |
| 4,779,603 A * | 10/1988 | Crocetti .................... 125/13.01 |
| 5,172,680 A * | 12/1992 | Swan ........................... 125/12 |
| 5,606,767 A * | 3/1997 | Crlenjak et al. .............. 15/301 |
| 5,676,124 A * | 10/1997 | Lee .......................... 125/13.01 |
| 5,746,193 A | 5/1998 | Swan |
| 5,807,414 A * | 9/1998 | Schaefer .................... 55/385.2 |
| 5,931,072 A * | 8/1999 | Shibata .......................... 83/98 |
| 6,119,676 A | 9/2000 | Greenland |
| 6,273,081 B1 | 8/2001 | Gorgol et al. |
| D451,109 S | 11/2001 | Governo et al. |
| 6,510,772 B1 * | 1/2003 | Brickner et al. ............. 83/100 |
| 6,521,104 B1 | 2/2003 | Kidd et al. |
| 6,782,882 B1 * | 8/2004 | Chen ....................... 125/13.01 |

* cited by examiner

*Primary Examiner*—M. Rachuba
(74) *Attorney, Agent, or Firm*—Greer, Burns & Crain, Ltd

(57) ABSTRACT

Dust and debris resulting from the sawing or cutting of concrete masonry units, blocks, bricks, tiles and other masonry products is collected via a three point dust and debris collection system. A movable work supporting table for cooperation with a masonry saw has a grated surface, a vacuum chamber below the grated surface acting as one collection point or area, a heavy debris collection chamber below and in communication with the table vacuum chamber acting as another collection point or area, and a shroud or hood assembly extending rearwardly from the table adapted to extend about the sides and rear of the saw blade and including a vacuum chamber acting as a primary collection point or area. The system is highly effective in achieving dust capture.

20 Claims, 5 Drawing Sheets

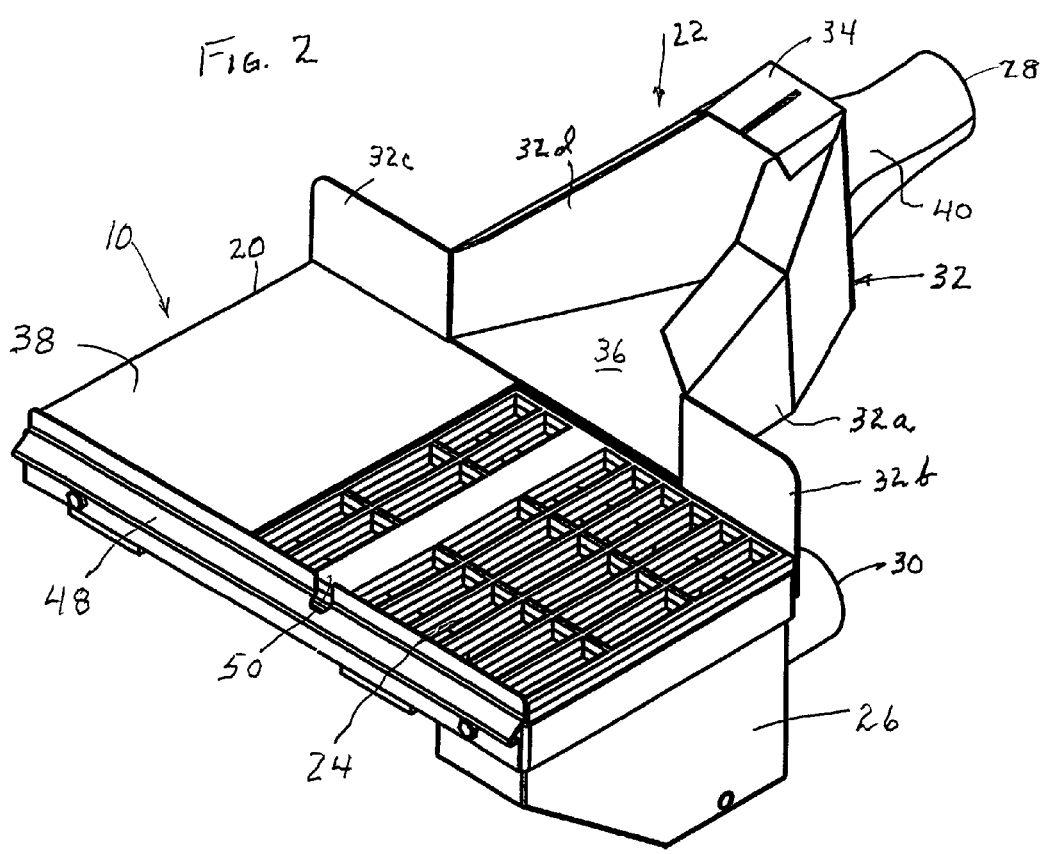

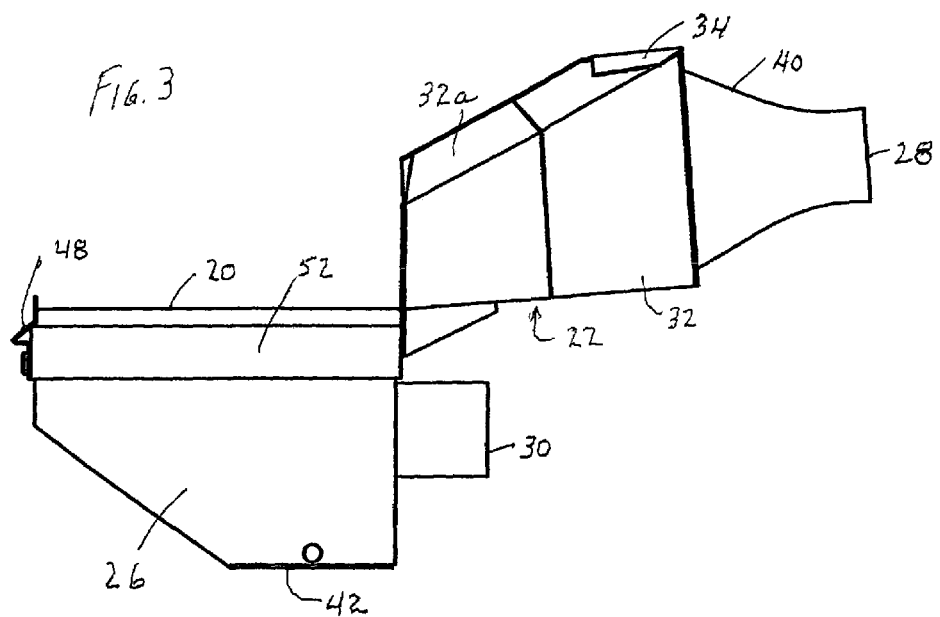
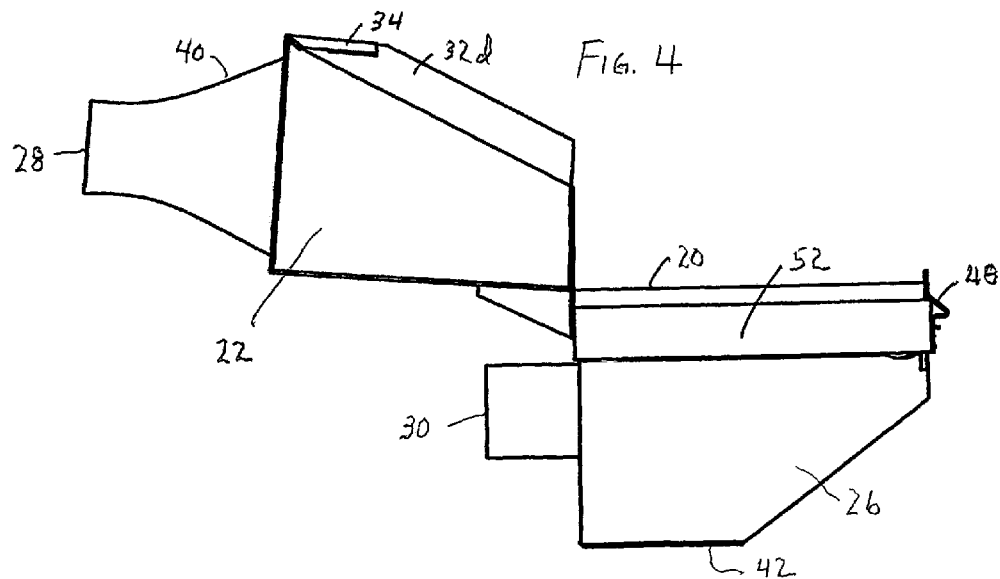

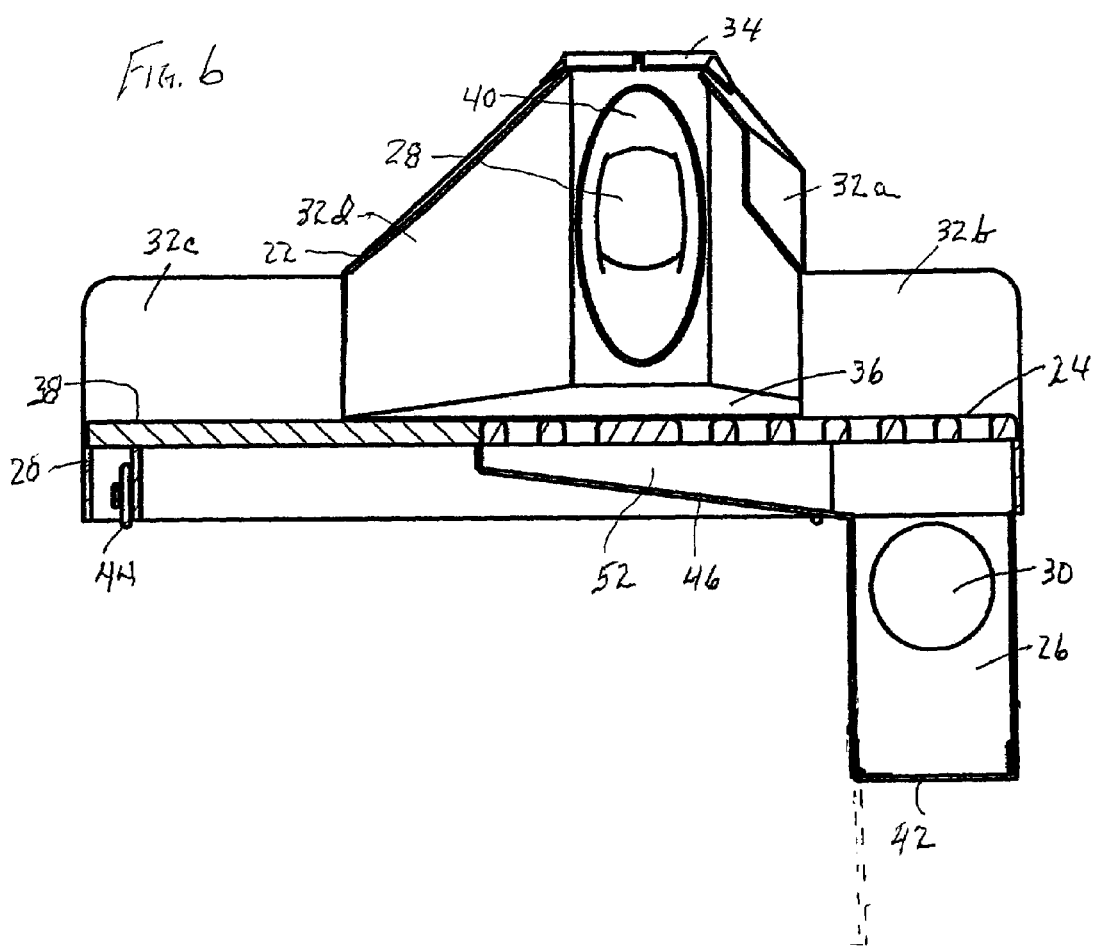

US 7,013,884 B2

DUST COLLECTION SYSTEM FOR A MASONRY SAW

FIELD OF THE INVENTION

This invention relates to masonry saws, and in particular, to a dust collection system for saws used for the cutting of concrete block, brick, tile and the like.

BACKGROUND OF THE INVENTION

In the cutting of masonry products, such as concrete masonry units ("CMU") at a job site, much dust is released into the air as a result of the cutting process. Saws create dust at various points on the saw blade, releasing the dust into the environment as well as into the face of the worker. To minimize the release of the extreme amounts of dust into the air, various methods have been introduced over the years. Wet cutting is one of the methods. This allows water to be used at the cut to keep the dust from dispersing. The method works well, but has drawbacks in situations where the waste water from the wet cutting is a polluting factor. Another disadvantage of wet cutting occurs on the exposed or finished product side of a CMU. After wet cutting, the CMU needs to be cleaned of the slurry created by the mixture of dust and water during the wet cutting process. This requires more labor and more water for the cleaning process, which in turn wastes man-hours and dollars, as well as creating more waste water run off.

While masonry saws and the movable tables used with them have been around for some time, the art has not taken the next logical step, which is to protect the worker and the environment from the dust created from this type of work. Currently on job sites, State and Federal requirements are getting ever stricter regarding the release of water waste, in the case of wet cutting, or dust, in the case of dry cutting. Some attempts have been made to solve this problem, with limited results.

U.S. Pat. No. 6,273,081 to Gorgol employs a vacuum system for dust collection during dry saw operation. This apparatus is limited in its scope of use to tile, pavers, bricks and other small masonry units. The sawdust removal system is also limited in that the area of dust collection is inadequate. Outside the field of masonry, U.S. Pat. No. 4,576,072 to Terpstra, et al. discloses a sawdust collection apparatus for a table saw in a wood shop environment. This system places the dust collection at the back of the blade. The drawback of that in the masonry field is that much dust would still be released into the surrounding work area if employed in the cutting of large masonry units.

SUMMARY OF THE INVENTION

The object of the present invention is to provide a dust collection system for masonry saws that minimizes the amount of dust particles released into the atmosphere during the cutting process, both for the protection of the worker and the protection of the environment.

Another object of the invention is to provide a dust collection system that is effective for use in the sawing of all masonry units, from small to large, and that is especially adapted for use in the cutting of concrete blocks.

The invention proposes to increase the area of dust collection to accommodate a large variety of masonry materials and to provide a three-point dust collection system effective over the increased area.

In accordance with the invention, a dust collection system for masonry saws is comprised of a movable work supporting table and associated dust and debris collection components such that the collection system as a whole moves with a work piece, e.g., a concrete block, as the work piece is moved toward and away from the saw blade.

The collection system is comprised of three dust and debris collection points or areas. First, a vacuum hood assembly or shroud is attached to the back of the movable saw table and connected to a vacuum source. Second, the table surface is provided with a grating and a vacuum chamber below the grating, also connected to a vacuum source, to act as a secondary dust collection area. Third, a heavy debris collection chamber is provided below the table vacuum chamber. These three areas work in conjunction to effectively capture the dust and debris produced in the cutting process. The vacuum table and vacuum hood or shroud assembly are of such design that the volume of dust from the blade in the cutting process is compatible with the velocity of the vacuum systems used to capture the volume of dust created.

The collection system of the invention can be constructed of a variety and/or combination of materials to accommodate various manufacturing methods and, with minor modification, can be made to accommodate any manufacture's size and type of saw.

These and other objects and advantages of the invention will become apparent to those of reasonable skill in the art from the following detailed description, as taken in conjunction with the accompanying drawings.

BRIEF DESCRIPTION OF THE DRAWINGS

FIG. 2 is a perspective view of the preferred embodiment of the dust collection system;

FIG. 3 is a right side view of the preferred embodiment of the dust collection system;

FIG. 4 is left side view of the preferred embodiment of the dust collection system;

FIG. 6 is a cross sectional view taken along line 6—6 of FIG. 5.

DETAILED DESCRIPTION OF A PREFERRED EMBODIMENT

The following is a detailed description of one embodiment of the invention presently deemed by the inventor to be the best mode of carrying out his invention.

Figure 1:
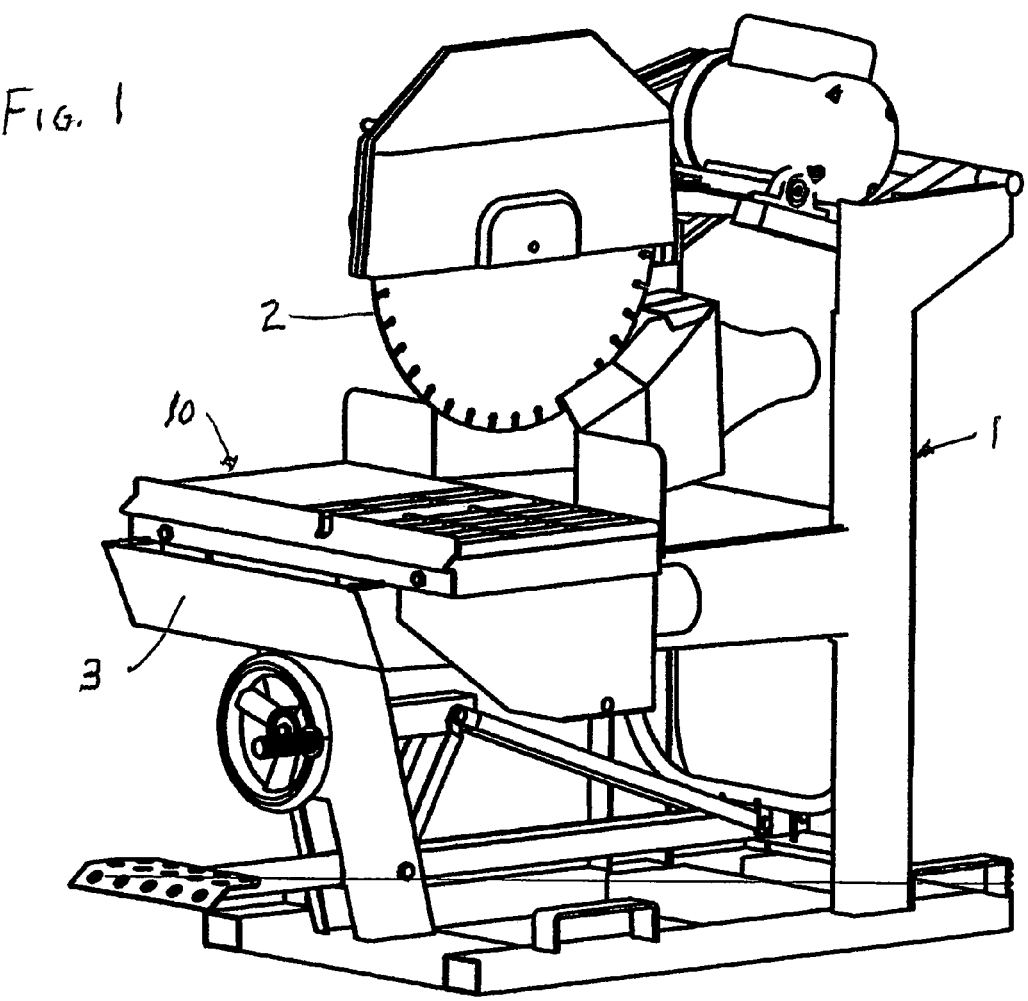
FIG. 1 is a perspective view of a preferred embodiment of the dust collection system of the present invention as associated with a typical masonry saw.

Referring to the drawings, particularly to FIG. 1, a conventional, commercially available masonry saw, indicated generally at 1, having a saw blade 2 and a supporting frame or tray 3 is shown as equipped with a preferred embodiment of the dust collection system 10 of the present invention.

Referring to FIG. 2, the dust collection system 10 comprises a movable masonry saw table 20, a vacuum shroud or hood assembly 22, a grated table surface 24 and underlying vacuum chamber 52, a heavy debris collection chamber 26, a hood vacuum intake 28 and a table vacuum intake 30. The table 20 is slidably supported on the saw frame 3 for movement toward and away from the blade 2 by wheels 44 located at the four corners of the table, as is conventional in the art.

The hood or shroud assembly 22 includes rigid skirting 32 comprised of side skirts 32a–32d generally surrounding the two sides and rear of the saw blade 2 to channel dust into a main dust collection channel 40. The channel 40 is located at the vortex or apex of the skirts and communicates with the vacuum source 28. To prevent extraneous dust from leaving the cutting area and for providing a means for the blade to work unimpeded, flexible skirting 34 is provided at the upper connection between the dust collection channel 40 and the skirting 32. The hood assembly or shroud 22 has a sloped floor 36 leading from the channel 40 down to the table 20 to facilitate collection and removal of dust. The masonry saw table 20 has a grate surface 24 for dust and heavy debris collection. Dust and debris fall through the grating and into the underlying vacuum chamber 52, which has a sloped floor 46 leading to the heavy debris collection chamber 26. Dust particles are removed from the table vacuum chamber 52 via the connection 30 to the vacuum source. Heavy debris passes through the grating 24 and down the sloped floor 46 and collects below the table vacuum chamber 52 in the heavy debris collection chamber 26. The vacuum intake 30 is located as far above the floor of the chamber 26 as feasible in order to minimize the possibility that debris collected in the chamber 26 would choke off the vacuum intake. The heavy debris collection chamber 26 has a hinged dump door 42 at its bottom to facilitate the removal and disposal of heavy debris. Additionally, a portion of the saw table is comprised of a solid surface 38. A cutting fence 48 is provided at the front of the table 20 to allow the material being cut to be squared to the cutting blade. A table blade stop 50 is provided within the grated surface 24.

Figure 5:
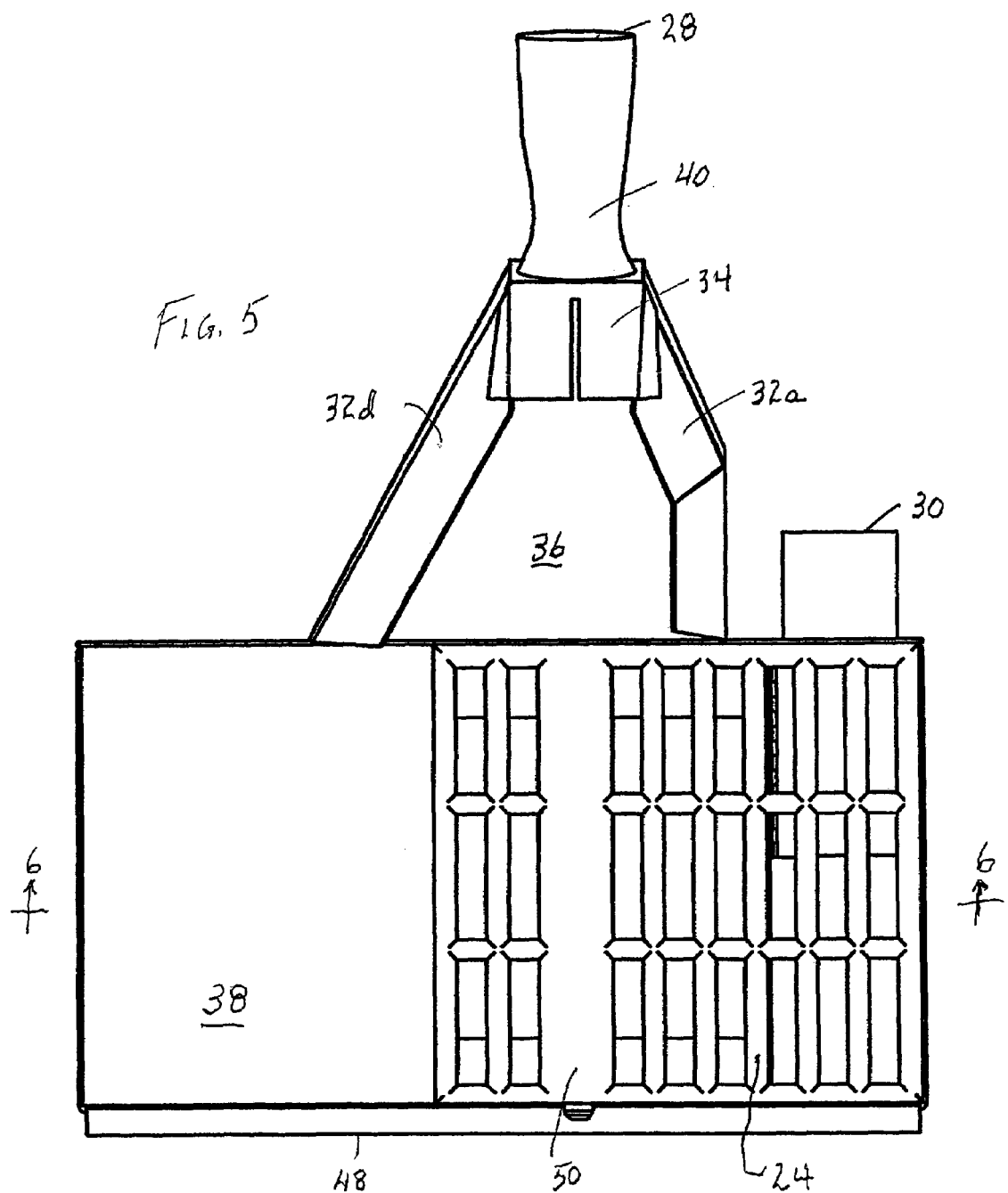
FIG. 5 is a top plan view of the dust collection system.

The location of the skirts 32a–32d and the grating 24 is important to effective collection and disposal of masonry dust and debris. Based on extensive testing of a variety of different cuts on a variety of masonry units of different sizes and configurations, the inventor has discovered that in the vast majority of cases, about 95% of the cases, the dust from the cutting blade moves within an area of about 135 degrees around the blade, specifically, with the plane of the cutting fence 48 as the reference, from about 10:00 o'clock to about 3:00 o'clock. To facilitate effective collection within this area, it is preferable, as shown in FIG. 5, to have the left hand skirt 32d extend at an angle from about 25 to about 40 degrees, more preferably about 30 degrees, to the plane of the blade. To have the right hand skirt 32a extend at an angle from about 10 to about 30 degrees, more preferably about 20 degrees, to the plane of the blade and then parallel to the blade, and to have the grate surface 24 occupy most or all of the space to the right of the blade, more preferably, about 60% of the table surface, i.e., from a location spaced from the left side of the blade to a location widely spaced from the right side of the blade. The solid portion 38 of the table may suitably be rubber mating laid flush with the grating surface.

The above described assembly of a movable table and associated structural components provides adequate clearance so that the table and the hood or shroud assembly can move freely relative to the saw blade and the machine frame, and at the same time provide for effective collection of dust and debris. Dust capture is excellent, averaging about 95% to 100% capture.

The objects and advantages of the invention have thus been shown to be attained in a convenient, practical, economical and facile matter.

While a presently preferred embodiment of the invention has been herein illustrated and described, it is to be appreciated that various changes, rearrangements and modifications can be made therein without departing from the scope of the invention as defined by the appended claims.

What is claimed:

1. A dust collection system for masonry saws comprising:
a movable work supporting table having a grated surface,
a shroud on the table having side skirts for extension on opposite sides of a blade of the saw and converging to an apex rearwardly of the blade,
a shroud vacuum chamber at the apex of the shroud, and
a table vacuum chamber connected to the table below the grated surface.

2. A dust collection system as set forth in claim 1, including a heavy debris collection chamber below the grated surface.

3. A dust collection system as set forth in claim 1, including a heavy debris collection chamber below and in open communication with the table vacuum chamber.

4. A dust collection system as set forth in claim 3 wherein the table vacuum chamber has a floor sloped toward the heavy debris collection chamber.

5. A dust collection system as set forth in claim 3 wherein the table vacuum chamber has a vacuum intake located above a floor of the heavy debris collection chamber.

6. A dust collection system as set forth in claim 1 wherein the vacuum chambers have individual vacuum intakes.

7. A dust collection system as set forth in claim 1 wherein the grated surface extends from a location a short distance from the left side of the blade to a location widely spaced from the right side of the blade.

8. A dust collection system as set forth in claim 7 wherein the grated surface occupies at least about 60% of the table surface.

9. A dust collection system as set forth in claim 1 wherein the skirt for extension to the left side of the blade extends at an angle from about 25 to about 40 degrees to the plane of the blade.

10. A dust collection system as set forth in claim 1 wherein the skirt for extension to the left side of the blade extends at an angle of about 30 degrees to the plane of the blade.

11. A dust collection system as set forth in claim 1 wherein the skirt for extension to the right side of the blade extends at an angle from about 10 to about 30 degrees to the plane of the blade.

12. A dust collection system as set forth in claim 1 wherein the skirt for extension to the right side of the blade extends at an angle of about 20 degrees to the plane of the blade.

13. A dust collection system as set forth in claim 1 wherein the skirt for extension to the left side of the blade extends at an angle from about 25 to about 40 degrees to the plane of the blade and the skirt for extension to the right side of the blade extends at an angle from about 10 to about 30 degrees to the plane of the blade.

14. A dust collection system as set forth in claim 1 wherein the shroud includes a bottom sloped upwardly from the table to the apex of the shroud.

15. A dust collection system as set forth in claim 1 wherein the shroud includes a flexible skirt extending between the tops of the side skirts at the apex of the shroud.

16. A dust collection system as set forth in claim 1 wherein the shroud extends rearwardly from the table and includes a bottom extending rearwardly from the table to the apex of the shroud and a flexible skirt extends between the tops of the side skirts at the apex of the shroud.

17. A dust collection system for masonry saws comprising:
- a movable work supporting table having a grated surface,
- a vacuum chamber on the table below the grated surface,
- a shroud extending rearwardly from the table having a bottom and side skirts for extension on opposite sides of the blade of the saw and converging to an apex rearwardly of the blade,
- a vacuum chamber at the apex of the shroud, and
- a heavy debris collection chamber below and in open communication with the table vacuum chamber.

18. A dust system as set forth in claim 17 wherein the vacuum chambers have individual vacuum intakes.

19. A dust collection system for masonry saws comprising:
- a table having a grated surface,
- a table vacuum chamber coupled to the table below the grated surface,
- a shroud vacuum chamber, and
- a shroud between the table and the shroud vacuum chamber having left and right side skirts on opposite sides of a blade of the saw, a floor sloping downwardly from the shroud vacuum chamber to the grated surface of the table, and a flexible skirt extending between the tops of the side skirts.

20. A dust collection system as in claim 19 including a heavy debris collection chamber below and in open communication with the table vacuum chamber.

* * * * *